(12) United States Patent
Jiang et al.

(10) Patent No.: US 9,311,123 B2
(45) Date of Patent: Apr. 12, 2016

(54) DISTRIBUTED VIRTUAL SECURITY APPLIANCE AND FLOW-BASED FORWARDING SYSTEM USING VIRTUAL MACHINES

(71) Applicant: Hillstone Networks, Corp., Sunnyvale, CA (US)

(72) Inventors: Dongyi Jiang, San Jose, CA (US); Jin Shang, Saratoga, CA (US); David Yu, San Jose, CA (US); Michael Lin, Cupertino, CA (US); Jun Xie, Sunnyvale, CA (US); Ye Zhang, Sunnyvale, CA (US); Mike Ji, Cupertino, CA (US)

(73) Assignee: Hillstone Networks, Corp., Sunnyvale, CA (US)

( * ) Notice: Subject to any disclaimer, the term of this patent is extended or adjusted under 35 U.S.C. 154(b) by 129 days.

(21) Appl. No.: 13/934,119

(22) Filed: Jul. 2, 2013

(65) Prior Publication Data
US 2015/0012917 A1 Jan. 8, 2015

(51) Int. Cl.
*G06F 15/173* (2006.01)
*G06F 15/16* (2006.01)
*G06F 9/455* (2006.01)
*H04L 29/06* (2006.01)

(52) U.S. Cl.
CPC ........ *G06F 9/45533* (2013.01); *G06F 9/45558* (2013.01); *H04L 63/0209* (2013.01); *G06F 2009/45587* (2013.01); *G06F 2009/45595* (2013.01)

(58) Field of Classification Search
CPC ..... H04L 45/302; H04L 45/306; H04L 45/60; H04L 63/0236

USPC ................................. 709/228, 242, 243, 250
See application file for complete search history.

(56) References Cited

U.S. PATENT DOCUMENTS

| | | | |
|---|---|---|---|
| 7,882,538 B1 | 2/2011 | Palmer | |
| 7,886,335 B1 | 2/2011 | Chickering | |
| 8,339,959 B1 * | 12/2012 | Moisand et al. | 370/235 |
| 2003/0200295 A1 * | 10/2003 | Roberts et al. | 709/223 |
| 2009/0003364 A1 * | 1/2009 | Fendick et al. | 370/401 |
| 2009/0003375 A1 * | 1/2009 | Havemann et al. | 370/463 |

(Continued)

FOREIGN PATENT DOCUMENTS

CN 201310239522 9/2013

OTHER PUBLICATIONS

Non-Final Office Action dated May 22, 2015 for U.S. Appl. No. 13/843,653.
Final Office Action dated Nov. 18, 2015 for U.S. Appl. No. 13/843,653.
Non-Final Office Action dated Dec. 4, 2015 for U.S. Appl. No. 13/934,119.

*Primary Examiner* — Hieu Hoang
(74) *Attorney, Agent, or Firm* — Vista IP Law Group, LLP

(57) ABSTRACT

A method performed by a network system having a plurality of processing units implemented using a plurality of respective virtual machines, includes: receiving a first packet at a first virtual machine of the plurality of virtual machines, wherein the first virtual machine is configured to receive the first packet from a network through an interface and has session processing capability; calculating a first value using a mathematical algorithm based on one or more information regarding the first packet; and using the calculated first value to identify a second virtual machine of the plurality of virtual machines in the network system.

45 Claims, 9 Drawing Sheets

(56) References Cited

U.S. PATENT DOCUMENTS

| | | | |
|---|---|---|---|
| 2010/0043068 A1* | 2/2010 | Varadhan et al. | 726/15 |
| 2012/0182992 A1* | 7/2012 | Cowart | H04L 45/22 370/392 |
| 2012/0314608 A1* | 12/2012 | Okuno et al. | 370/252 |
| 2014/0003232 A1* | 1/2014 | Guichard et al. | 370/230 |
| 2014/0177640 A1* | 6/2014 | Yang | H04L 45/586 370/401 |

\* cited by examiner

DISTRIBUTED VIRTUAL SECURITY APPLIANCE AND FLOW-BASED FORWARDING SYSTEM USING VIRTUAL MACHINES

RELATED APPLICATION DATA

This application relates by subject matter to U.S. patent application Ser. No. 13/843,653, filed on Mar. 15, 2013, pending. The entire disclosure of the above-identified application is expressly incorporated by reference herein.

FIELD

This application relates generally to network security devices and systems, such as firewalls and security devices, and more specifically, to cloud security virtual appliance. An embodiment described herein is for cloud and data center application.

BACKGROUND

Network appliances, such as high end distributed security gateway, have been used for protecting networks from various attacks, intrusions detection and prevention, providing high performance packet routing, and other application services. In some cases, such network appliance may include multiple processing units for performing different packet processing functions. Such processing units may be managed by a centralized CPU, which hosts a centralized database for storing all information for all of the multiple processing units.

Applicant of the subject application has determined that it may be desirable to have a network system that uses a distributed database, rather than a centralized database, for processing packets. Also, applicant of the subject application has determined that it may be desirable to implement such network system using virtual machines.

SUMMARY

A method performed by a network system having a plurality of processing units implemented using a plurality of respective virtual machines, includes: receiving a first packet at a first virtual machine of the plurality of virtual machines, wherein the first virtual machine is configured to receive the first packet from a network through an interface and has session processing capability; calculating a first value using a mathematical algorithm based on one or more information regarding the first packet; and using the calculated first value to identify a second virtual machine of the plurality of virtual machines in the network system.

Optionally, the one or more information comprises one or a combination of a source IP address, a destination IP address, a source port identifier, a destination port identifier, and protocol information.

Optionally, at least two of the virtual machines are configured to perform different respective packet processing functions.

Optionally, the method further includes retrieving data from the identified second virtual machine based at least in part on a set of information regarding the first packet, the set of information being a superset of the one or more information used to calculate the first value.

Optionally, the set of information for retrieving the data comprises source IP address, destination IP address, source port, destination port, and protocol information, and wherein the one or more information for calculating the first value comprises a subset of the set of information.

Optionally, the act of retrieving the data from the identified second virtual machine comprises retrieving the data from a database associated with the second virtual machine.

Optionally, the method further includes receiving data from the identified second virtual machine, wherein the act of receiving the data is performed by a third virtual machine of the plurality of virtual machines in the network system that is different from the second virtual machine identified using the calculated first value.

Optionally, at least some of the virtual machines have respective databases associated therewith, and the method further comprises storing data regarding the first packet at one of the databases that is associated with the identified second virtual machine.

Optionally, at least one of the databases does not have a copy of the data.

Optionally, the method further includes: receiving a second packet at the network system; calculating a second value based on one or more information regarding the second packet; and using the calculated second value to identify a third virtual machine of the plurality of virtual machines.

Optionally, the method further includes: creating a packet processing session based at least in part on the first packet, the packet processing session representing a packet processing plan.

Optionally, the first virtual machine is a DVIOM virtual machine, and the packet processing session is created by the DVIOM virtual machine.

Optionally, the method further includes storing the packet processing session in a first session database associated with the first virtual machine at which the first packet is received.

Optionally, the packet processing session is also stored in a second session database for another one of the virtual machines at which the first packet is egressed.

Optionally, the method further includes: receiving a second packet at the first virtual machine; processing the second packet at the first virtual machine according to the packet processing session; and egressing the second packet from the first virtual machine.

Optionally, the first virtual machine is a DVIOM virtual machine.

Optionally, the method further includes: receiving a second packet at the first virtual machine; transmitting the second packet to a third virtual machine; processing the second packet at the third virtual machine according to the packet processing session; and egressing the second packet from the third virtual machine.

Optionally, the first virtual machine is a first DVIOM virtual machine, and the third virtual machine is a second DVIOM virtual machine.

Optionally, the network system is configured to perform packet processing in either a slow-path or a fast-path, and the act of calculating the first value and the act of using the calculated first value to identify the second virtual machine are performed while processing the first packet in the slow-path.

Optionally, at least some of the virtual machines have respective databases associated therewith, and the method further comprises storing packets and/or information regarding the packets among the databases in a distributed manner.

A network system, includes: a plurality of virtual machines that are communicatively connected to each other; wherein a first virtual machine of the plurality of virtual machines is configured to receive a first packet from a network through an interface and has session processing capability; and wherein the first virtual machine is configured for: calculating a first value using a mathematical algorithm based on one or more information regarding the first packet; and using the calculated first value to identify a second virtual machine of the plurality of virtual machines.

Optionally, the one or more information comprises one or a combination of a source IP address, a destination IP address, a source port identifier, a destination port identifier, and protocol information.

Optionally, at least two of the virtual machines are configured to perform different respective packet processing functions.

Optionally, the first virtual machine is configured for retrieving data from the identified second virtual machine based at least in part on a set of information regarding the first packet, the set of information being a superset of the one or more information used to calculate the first value for identifying the second virtual machine.

Optionally, the set of information for retrieving the data comprises source IP address, destination IP address, source port, destination port, and protocol information, and wherein the one or more information for calculating the first value comprises a subset of the set of information.

Optionally, the first virtual machine is configured for retrieving data from the identified second virtual machine by retrieving data from a database associated with the second virtual machine.

Optionally, the network system further includes respective databases associated with at least some of the virtual machines, wherein one of the databases that is associated with the identified second virtual machine is configured for storing data regarding the first packet.

Optionally, at least one of the databases does not have a copy of the data.

Optionally, the first virtual machine is configured for: calculating a second value based on one or more information regarding a second packet; and using the calculated second value to identify a third virtual machine of the plurality of virtual machines.

Optionally, one of the virtual machines is configured for creating a packet processing session based at least in part on the first packet, the packet processing session representing a packet processing plan.

Optionally, the first virtual machine is a DVIOM virtual machine, and is configured to create the packet processing session.

Optionally, the network system further includes a first session database for storing the packet processing session, the first session database associated with the first virtual machine at which the first packet is received.

Optionally, the network system further includes a second session database for storing the packet processing session, the second session database associated with another one of the virtual machines at which the first packet is egressed.

Optionally, the first virtual machine is configured for: receiving a second packet; processing the second packet according to the packet processing session; and egressing the second packet from the first virtual machine.

Optionally, the first virtual machine is a DVIOM virtual machine.

Optionally, the first virtual machine is configured for receiving a second packet, and transmitting the second packet to a third virtual machine; and wherein the third virtual machine is configured for processing the second packet according to the packet processing session, and egressing the second packet from the third virtual machine.

Optionally, the first virtual machine is a first DVIOM virtual machine, and the third virtual machine is a second DVIOM virtual machine.

Optionally, the first packet is egressed at a third virtual machine, and wherein the packet processing session is stored in the first virtual machine at which the first packet is received, and in the third virtual machine at which the first packet is egressed.

Optionally, the network system is configured to perform packet processing in either a slow-path or a fast-path, and the first virtual machine is configured to perform the act of calculating the first value and the act of using the calculated first value to identify the second virtual machine while processing the first packet in the slow-path.

Optionally, the first virtual machine provides a first application processing function, and the second virtual machine provides a second application processing function.

Optionally, the first virtual machine provides an I/O function, and the second virtual machine provides an application processing function.

Optionally, the network system further includes respective databases associated with at least some of the virtual machines, wherein packets and/or information regarding the packets are stored among the databases in a distributed manner.

A network system includes: a plurality of machines that are communicatively connected to each other, the plurality of machines comprises at least one virtual machine and at least one physical machine; wherein a first machine of the plurality of machines is configured to receive a first packet from a network through an interface and has session processing capability; and wherein the first machine is configured for: calculating a first value using a mathematical algorithm based on one or more information regarding the first packet; and using the calculated first value to identify a second machine of the plurality of machines.

Optionally, the at least one virtual machine is the first machine.

Optionally, the at least one physical machine is the first machine.

Optionally, the at least one virtual machine comprises a first virtual machine and a second virtual machine.

Optionally, the first virtual machine is the first machine, and the second virtual machine is the second machine.

Optionally, the at least one physical machine comprises a first physical machine and a second physical machine.

Optionally, the first physical machine is the first machine, and the second physical machine is the second machine.

Optionally, the at least one virtual machine comprises a plurality of DVIOM virtual machines.

Optionally, the at least one virtual machine comprises a plurality of DVSSM virtual machines.

Optionally, the at least one physical machine comprises a plurality of physical machines configured to interface with the network through respective I/O interfaces.

Optionally, the at least one physical machine comprises a plurality of physical machines configured to provide firewall security functions.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
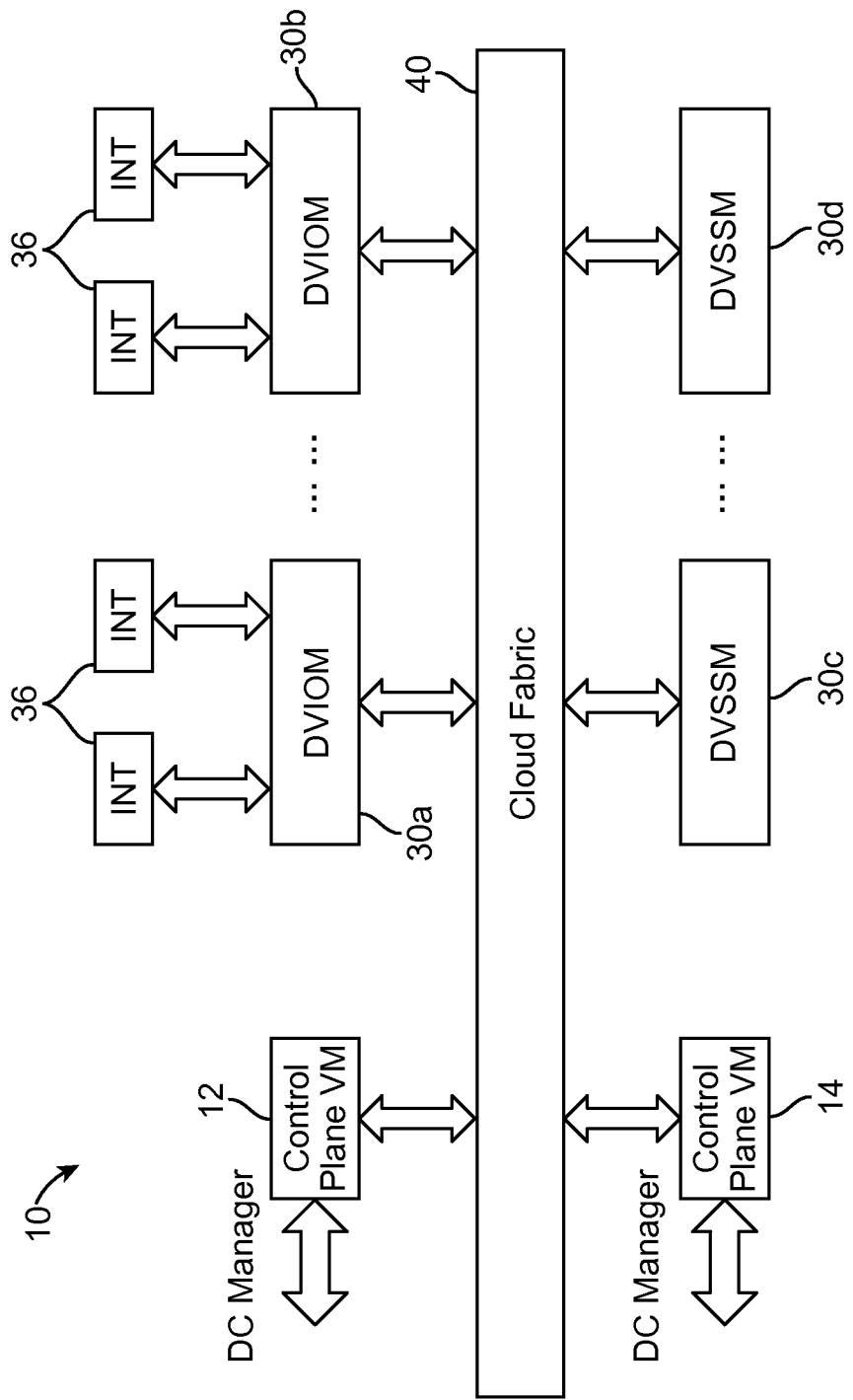
FIG. 1 illustrates a network system implemented using a plurality of virtual machines in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 illustrates a network system 10 in accordance with some embodiments. In the illustrated embodiments, the network system 10 is a firewall system that has flow-based forwarding capability. In other embodiments, the network system 10 may be other types of network systems. The network system 10 includes a plurality of virtual machines (VM) 30 that are communicatively coupled to each other through a cloud fabric 40. In the illustrated embodiments, the cloud fabric 40 that communicatively couples the virtual machines 30 may be the Internet, or any network. In the illustrated example, four virtual machines 30 (virtual machines 30a-30d) are shown. However, it should be understood that in other embodiments, there may be more than four virtual machines 30 or fewer than four virtual machines 30. As shown in the figure, the virtual machines 30a, 30b are respective distributed virtual I/O modules (DVIOMs), and the virtual machines 30c, 30d are respective distributed virtual security service modules (DVSSMs). The system 10 further includes a plurality of interfaces (INTs) 36 associated with the DVIOM virtual machines 30a, 30b. In some embodiments, the INTs 36 may be virtual logical interfaces seen from the DVIOMs. In other embodiments, the DVINTs may be any kind of interfaces, including physical interfaces, aggregated interfaces or tunnel interfaces.

The system 10 further includes a first virtual control plane module (VCPM) 12 and a second virtual control plane module 14. A VCPM is a software module that runs control processing on virtual machine(s) and/or physical device(s). Its functionalities include pushing configurations to the distributed data plane (i.e., to the DVIOM and DVSSM virtual machines) to configure the components of the system 10, collecting the statuses and statistics involved in the operation of the virtual machines 30, monitoring health of the components in the system 10, running necessary application protocols and other management tasks, or combination of the foregoing. In the illustrated embodiments, both the VCPM 12 and the VCPM 14 are configured to operate with each other to provide control processing on virtual machine(s) and/or physical device(s). In other embodiments, the VCPM 12 is configured to provide the control processing functions, and the VCPM 14 is a backup so that when VCPM 12 is down, the VCPM 14 may continue to provide the same control processing functions. In other embodiments, the VCPM 12 and the VCPM 14 may operate together to provide control processing functions. A VCPM may run on one virtual machine, a group of virtual machines, a physical device, or a group of physical devices.

In some embodiments, DVIOMs are virtual machines implemented using software. A DVIOM may be configured to receive packets from interfaces (e.g., virtual interfaces, and/or physical interfaces), transmit packets to interfaces, or both. The DVIOM may also be configured to perform packet processing. A DVIOM may perform stateful, flow based packet processing and ensure traffic processing affinity to customer virtual machines. In some embodiments, when a DVIOM receives first packet of a particular traffic stream (flow) from ingress INT 36, it first performs a context (session) lookup based on certain algorithm (e.g., load-balancing algorithm, hashed algorithm, etc.). If there is no session existing, the DVIOM then transmits the packet through a slow path processing which will undergo the IDS, policy, routing, NAT and other applications like UTM, IDP, processing. The system 10 then establishes the session for this flow. When subsequent packet belonging to the same flow is received on the DVIOM, session lookup will result in a match, and packets will go through fast path processing according to the information stored in the session context.

In some embodiments, a DVSSM may be configured to provide security firewall services. By means of non-limiting examples, a DVSSM may perform any desired security processing, like policy lookup, NAT, route lookup, IDS, IDP, UTM, and/or other processing that may involve deep packet inspections. Also, in some embodiments, a DVSSM virtual machine 30 may be configured to perform one or more network processing function, such as firewall function, network security monitoring (such as intrusion detection), and/or network security prevention, including but not limited to intrusion prevention, anti-virus, URL blocking, QoS, etc. A DVSSM may also perform other application processing and create a session for one or more packets. It may also manage the session establishment and perform updates together with the DVIOM(s).

In some embodiments, components of the system 10 may be implemented using, or provided from, one or more data centers (DCs). For example, in one implementation, components (VCPM, DVIOM, DVSSM, INT) of the system 10 may be implemented at a rack (e.g., at a periphery) in a data center. Also, the DVIOM(s) may be placed closer to its virtual machine users, in terms of DC architecture, to save bandwidth, while the DVSSM(s) may be placed anywhere. Also, in some embodiments, the different virtual machines 30 may be located in different geographical locations (e.g., in different stations in a room, in different rooms, in different buildings, in different cities, in different states, etc.). Thus, while the system 10 is implemented as a distributed virtual security appliance, from logical point of view, it is still one security appliance.

In some embodiments, the system 10 further includes a plurality of databases associated with at least some of the virtual machines 30. For example, in some embodiments, the DVSSM virtual machines 30 may have respective databases (e.g., RTO databases and/or session databases). In other embodiments, the DVIOM virtual machines 30 may also have respective databases. The database of the virtual machine 30 may be a local database associated with the device that implements the virtual machine 30. In other embodiments, the database of the virtual machine 30 may be a database associated with the virtual software implementing the virtual machine 30. For example, the database may be a non-transitory medium at a provider of the virtual software, or a non-transitory medium that is communicatively coupled to the device running the virtual software. In one implementation, the database may be located at a data center (DC), or may be located elsewhere that is in communication with the data center.

Figure 2:
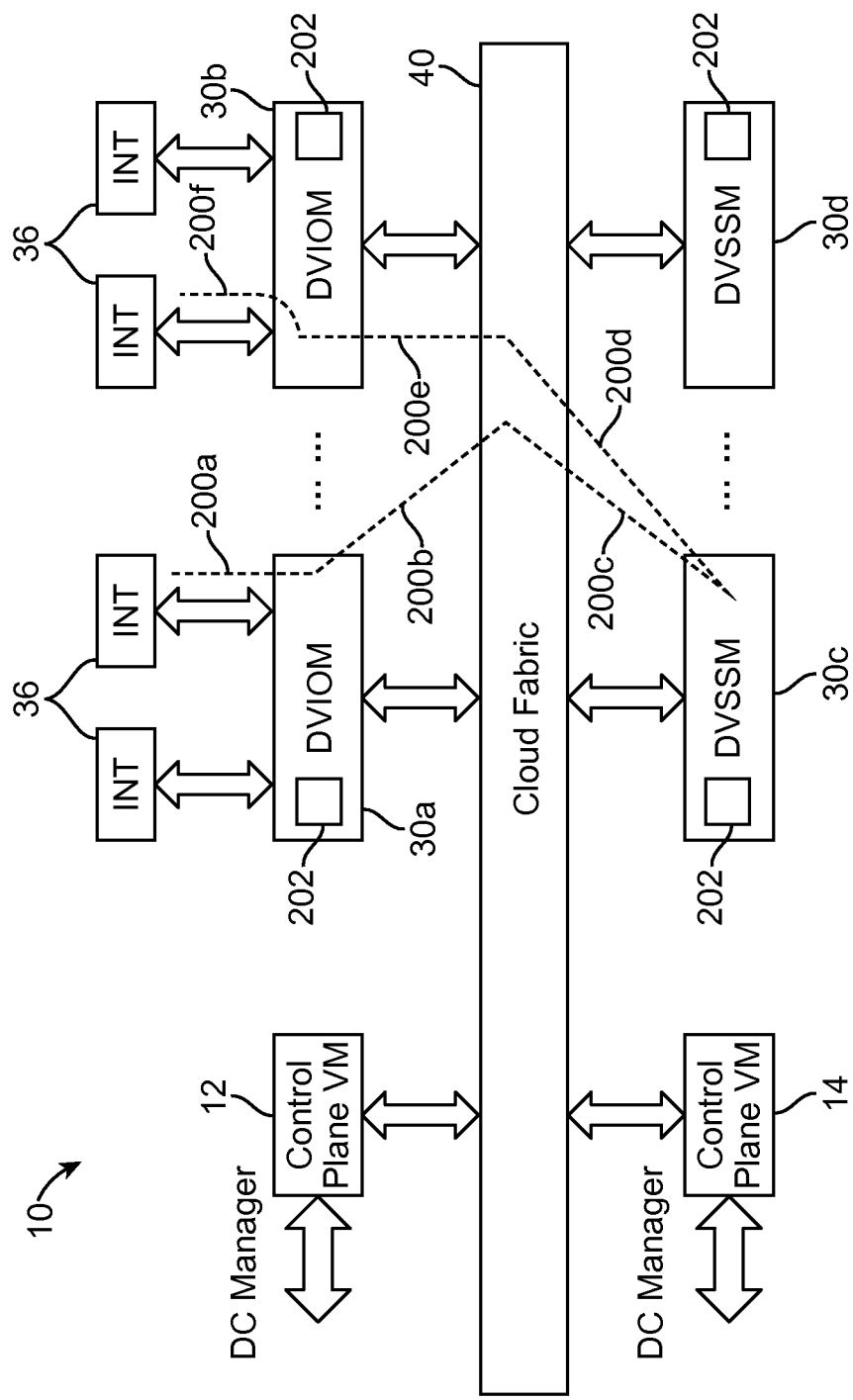
FIG. 2 illustrates the network system of FIG. 1, particularly showing the network system processing packets in a slow-path.

The virtual machine-implemented network system 10 is configured to process packets in at least two manners—i.e., a slow-path, and a fast-path. FIG. 2 illustrates a processing of packets by the network system 10 in the slow-path manner. First, a packet is received at the DVIOM virtual machine 30a through one of the INTs 36, as represented by arrow 200a. The DVIOM virtual machine 30a then looks up its session database to see if a session was previously set up for the packet. If there is no previous session, the DVIOM virtual machine 30a then passes the packet downstream for processing in the slow-path.

As shown in the figure, the packet is passed by the virtual machine 30a to the cloud fabric 40, as represented by arrow 200b, which then passes the packet to one of the virtual machines 30c, 30d (virtual machine 30c in the example), as represented by arrow 200c. In some embodiments, the virtual machine 30a that received the packet may calculate a hash value using one or more information regarding the packet, and use the hash value to identify the DVSSM virtual machine 30c to which to transmit the packet. In one implementation, the one or more information regarding the packet may be a 5-tuples that include source IP address, destination IP address, source port, destination port, and protocol information. In other embodiments, the one or more information regarding the packet may be a subset of the above information, or may have other types of information.

After the virtual machine 30c receives the packet, the DVSSM virtual machine 30c may perform session lookup to see if a session can be found for the packet (e.g., by looking up a local session database). If there is no session found, then the DVSSM virtual machine 30c then processes the packet (e.g., performs policy lookup, anti-virus check, and/or any of other network security checks, etc.), and creates a session 202. In some embodiments, the creation of the session may be performed based on policy, ALG, NAT, etc.

After the session 202 is created, the virtual machine 30c then passes the packet to the cloud fabric 40, as represented by arrow 200d. The cloud fabric 40 then passes the packet to the DVIOM virtual machine 30b, as represented by arrow 200e. The virtual machine 30b then passes the packet for egress (e.g., out of an egress interface).

In some embodiments, the created session 202 may represent a packet processing plan. For example, in some embodiments, the session 202 may have a data structure configured to represent different parameters for processing packets that belong to the same session. Information in the session 202 may be determined by one or more DVSSM virtual machine(s) 30.

In the illustrated embodiments, the created session 202 may be transmitted by the virtual machine 30c to the virtual machine 30a at which the packet was received, so that the session 202 may be stored at a database associated with the corresponding virtual machine 30a. The created session 202 may also be transmitted (e.g., via the cloud fabric 40) by virtual machine 30c to the virtual machine 30b at which the packet is egressed, wherein the packet may be stored at a database associated with the corresponding virtual machine 30b. Session is stored at both the DVIOM virtual machines 30a, 30b, so that when packet comes in from either direction (e.g., received at the virtual machine 30b for egress at the virtual machine 30a, or received at the virtual machine 30a for egress at the virtual machine 30b), the session information will be available either way at the virtual machine 30a or at the virtual machine 30b. As shown in the figure, the created session 202 may also be transmitted by the virtual machine 30c to the DVSSM virtual machine 30d (e.g., through the cloud fabric 40) for storage at a database for the other virtual machine 30d. For example, the DVSSM virtual machine 30c may identify the DVSSM virtual machine 30d based on hash information (e.g., 5 tuples) used in the I/O card. In some embodiments, the created session 202 may be associated with a value, which may be determined using information regarding the packet, wherein the value may be later used as an index to lookup the session 202. For example, in some embodiments, 5-tuples (e.g., source IP address, destination IP address, source port, destination port, protocol information) obtained from the packet may be used to determine a value, such as a hash value, and the created session 202 may then be stored in association with the hash value.

Figure 3A:
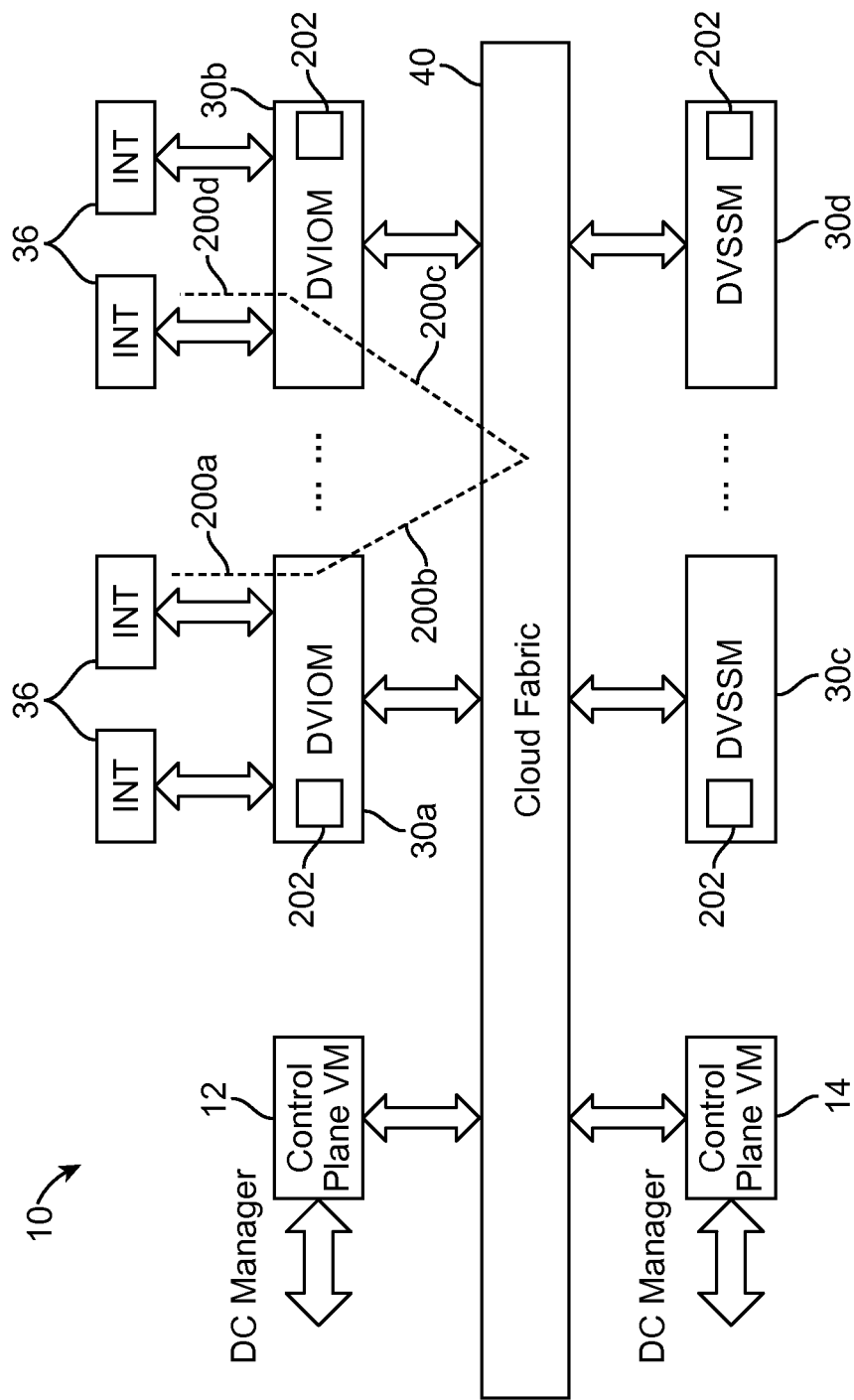
FIG. 3A illustrates the network system of FIG. 1, particularly showing the network system processing packets in a fast-path.

After the session 202 has been created, the next time the network system 10 receives a packet that belong to the same session, the packet may be processed in the fast-path. FIG. 3A illustrates a processing of packets by the network system 10 in the fast-path manner. First, a packet is received at the DVIOM virtual machine 30a, as represented by arrow 200a. The virtual machine 30a then looks up its session database to see if a session was previously set up for the packet. If there is no previous session, the virtual machine 30a then passes the packet downstream for processing in the slow-path, as discussed with reference to FIG. 2. In the illustrated example shown in FIG. 3A, there is a previous session 202 created. Thus, instead of passing the packet to the DVSSM virtual machine 30 (e.g., virtual machine 30c or 30d) via the cloud fabric 40, in this case, the packet is processed by the virtual machine 30a at which the packet is received according to the packet processing plan prescribed by the session 202 previously stored at the database for the virtual machine 30a. The packet is then passed to the cloud fabric 40 (as represented by arrow 200b), which then passes the packet to another DVIOM virtual machine 30b (as represented by arrow 200c). The packet is then egressed out of a port at the virtual machine 30b, as represented by arrow 200d. As shown in the figure, in the fast-path, the packet does not need to go through processing by a DVSSM virtual machine 30 to establish a new session, and thus, the processing speed for the fast-path is faster than the processing speed for the slow-path.

Figure 3B:
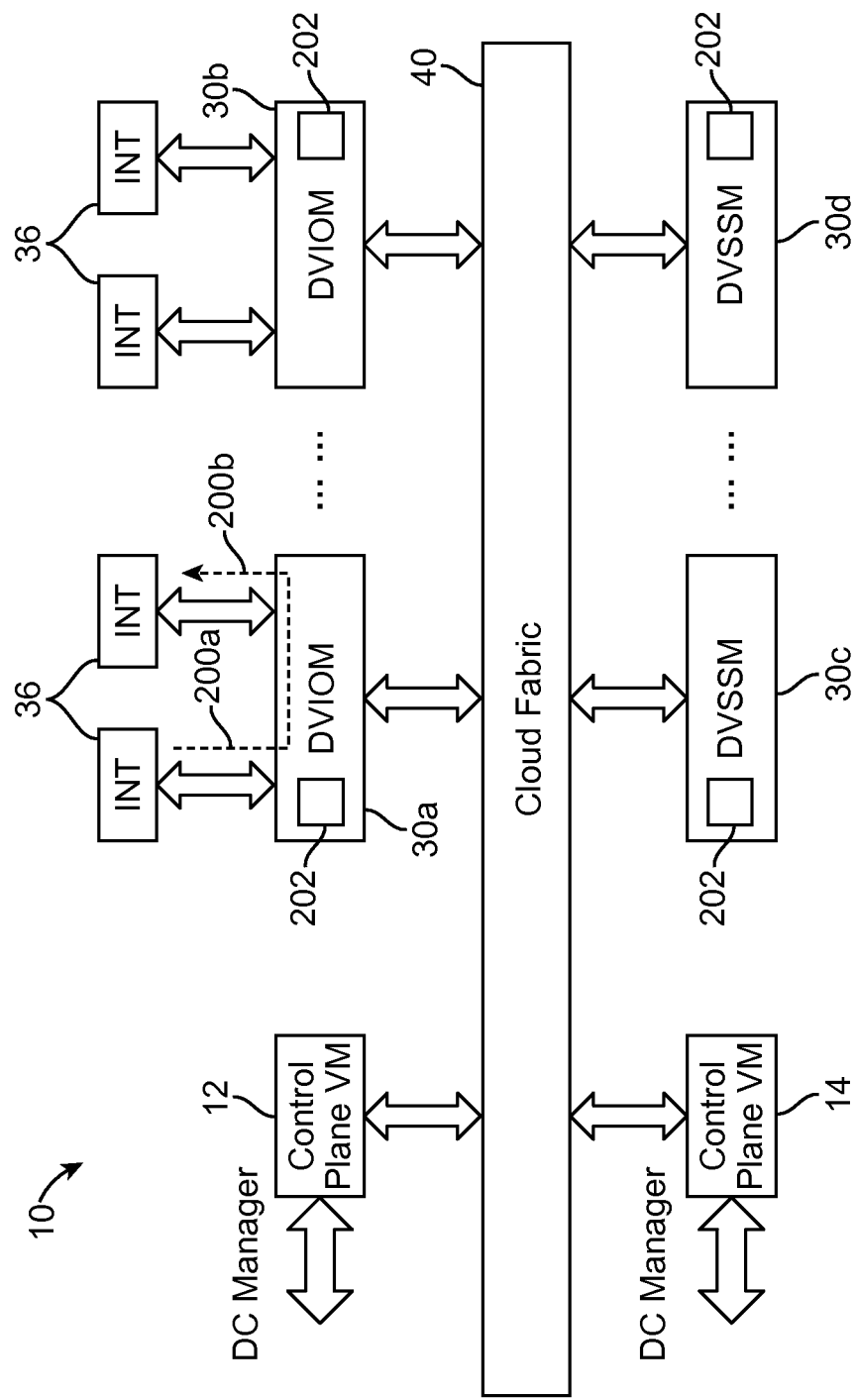
FIG. 3B illustrates the network system of FIG. 1, particularly showing the network system processing packets in another fast-path manner.

It should be noted that in some embodiments, in the fast-path, the packet may ingress to, and egress out of, the same DVIOM virtual machine 30, like that shown in FIG. 3B. First, a packet is received at the DVIOM virtual machine 30a, as represented by arrow 200a. The virtual machine 30a then looks up its session database to see if a session was previously set up for the packet. If there is no previous session, the virtual machine 30a then passes the packet downstream for processing in the slow-path, as discussed with reference to FIG. 2. In the illustrated example shown in FIG. 3B, there is a previous session 202 created. Thus, instead of passing the packet to the DVSSM virtual machine 30 (e.g., virtual machine 30c or 30d) via the cloud fabric 40, in this case, the packet is processed by the virtual machine 30a at which the packet is received according to the packet processing plan prescribed by the session 202 previously stored at the database for the virtual machine 30a. The packet is then egressed out of a port at the virtual machine 30a, as represented by arrow 200b. As shown in the figure, in the fast-path, the packet does not need to go through processing by a DVSSM virtual machine 30 to establish a new session, and thus, the processing speed for the fast-path is faster than the processing speed for the slow-path.

In other embodiments, both the first (or slow) path and the fast-path may be processed by the DVIOM virtual machines 30. In such cases, the DVSSM virtual machines 30 are responsible for location tracking for session, gate processing, cone NAT processing, etc. If a DVIOM virtual machine 30 (e.g., virtual machine 30a or 30b) identifies a new flow and no session is found, the DVIOM then sends a query to a DVSSM virtual machine 30 (e.g., virtual machine 30c or 30d).

In further embodiments, one or more DVIOM virtual machines may be configured to create session(s). Thus, the creation of session(s) may be performed by DVSSM virtual machine(s) 30, by DVIOM virtual machine(s) 30, or combination of both.

Thus, depending on the deployment requirements and configurations, traffic processing intelligences (TPI) may be provided by DVIOM(s), by DVSSM(s), or by both. In some embodiments, if TPI is provided by DVIOM(s), DVIOM(s) will perform the slow and fast path processing, and is the main workhorse of the traffic processing (e.g., the DVIOM may perform first path processing on its corresponding CPU). In this case, DVSSM(s) mainly helps to manage the sessions, tracks sessions and other resources like pinhole, cone NAT, monitors the health of DVIOM(s), collects statistics and logs, etc.

On the other hand, if TPI is provided by DVSSM(s), DVIOM(s) will perform session lookup and send those new packets without sessions to DVIOM(s) using certain consistent and balanced hashing algorithms. DVSSM will perform first path processing, including setting up session and performing application processing. DVSSM will then push the created session to DVIOM(s) afterwards. When the DVIOM later receives a new packet, DVIOM will perform session lookup. If the session lookup results in a match, DVIOM will perform fast packet forwarding and send the packet to egress through an interface directly (i.e., without going through a DVSSM virtual machine).

In some cases, a packet may be received from an interface at the DVIOM virtual machine 30b, and be transmitted out at a port associated with the DVIOM virtual machine 30a in the opposite direction in the fast-path configuration from that shown in FIG. 3. In such cases, because the session 202 is also stored in a database for the virtual machine 30b, the virtual machine 30b may look up its database to see that a session was previously set up for the packet. If a session was previously set up, the packet is then processed by the virtual machine 30b according to the packet processing plan prescribed by the session 202 previously stored at the database for the virtual machine 30b. The packet is then passed to the cloud fabric 40, which then passes the packet to the virtual machine 30a for egress out of an egress interface associated with the virtual machine 30a. In other embodiments, the session may be processed by the virtual machine 30a at which the packet is to be egressed. In such cases, the virtual machine 30b will forward packets to the virtual machine 30a for processing.

In some cases, the session 202 at the virtual machine 30a may be missing when virtual machine 30a receives a new packet. In such cases, the packet will be passed to one of the DVSSM virtual machines 30 (e.g., based on a hash value determined from one or more information regarding (e.g., in) the new packet) through the cloud fabric 40. The virtual machine 30c may determine that there is a session because it is stored in a database associated with the virtual machine 30c. In such cases, the packet will still be processed according to a fast-path configuration. In particular, the packet will be processed according to the previously created session 202, and be passed from the DVSSM virtual machine 30c to the DVIOM virtual machine 30b through the cloud fabric 40 for egressing the packet, without creating a new session. The virtual machine 30c may also send back a copy of the session 202 to the virtual machine 30a at which the packet was previously received for storage at a database associated with the virtual machine 30a, so that the virtual machine 30a may have access to the session 202 in the future that was previously missing.

Also, in some cases, the session 202 may prescribe packets to be processed by one or more DVSSM virtual machines 30. In such cases, packets may be passed to one or more virtual machines 30 for fast-path processing. For example, in some embodiments, the virtual machine 30a receiving the packet may perform session lookup. The virtual machine 30a may find the session for the packet, wherein the session 202 may prescribe the packet to be processed by certain DVSSM virtual machine 30 (e.g., virtual machine 30c). The packet is then forwarded to the DVSSM virtual machine 30c according to the session 202 along with a session ID. When the virtual machine 30c receives the packet and the session ID, the virtual machine 30c verifies the session by the session ID. If the session is found, the virtual machine 30c then processes the packet according to the session. After the packet is processed, the virtual machine 30c then passes the packet to a DVIOM virtual machine (e.g., virtual machine 30b) for egressing the packet.

As illustrated in the above example, creating the session 202 is advantageous because the session 202 contains all information of what is to be done for a particular packet. As the packet is being processed in the slow-path, the network system 10 collects information of what needs to be done for the packet. The network system 10 sets up the session 202 (containing information on what needs to be done on packet). This way, future packets do not need to go through the slow-path processing, and network system 10 can look up session to process future packets in the fast-path configuration.

As discussed, during the slow-path packet processing configuration, a session 202 is created. In the process, different network parameters may be determined. There may be different types of RTO representing different network parameters. By means of non-limiting example, different RTO types may represent flow session, VPN SA, application layer gateway (ALG) Gate, Cone network address translation (NAT) mapping, session limit, AD counter, syn attack counter, Gate with wildcard, IP action entry, etc., respectively.

In some embodiments, RTOs may be stored at different databases for the different respective DVSSM virtual machines 30 in a distributed manner. In such configuration, each DVSSM virtual machine 30 has a database which may be a subset of a hypothetical global database. A database for a virtual machine 30 may be a local database associated with the device that implements the virtual machine 30. In other embodiments, the database for the virtual machine 30 may be a database associated with the virtual software running on the virtual machine 30. For example, the database may be a non-transitory medium at a provider of the virtual software, or a non-transitory medium that is communicatively coupled to the device running the virtual software. In one implementation, the database may be located at a data center (DC), or may be located elsewhere that is in communication with the data center. Thus, a distributed database configuration may refer to multiple databases that are at different geographical locations, or may refer to multiple databases that are distributed among the virtual machines 30 (wherein the databases may be at a same data center, or may be located at different locations).

Figure 4:
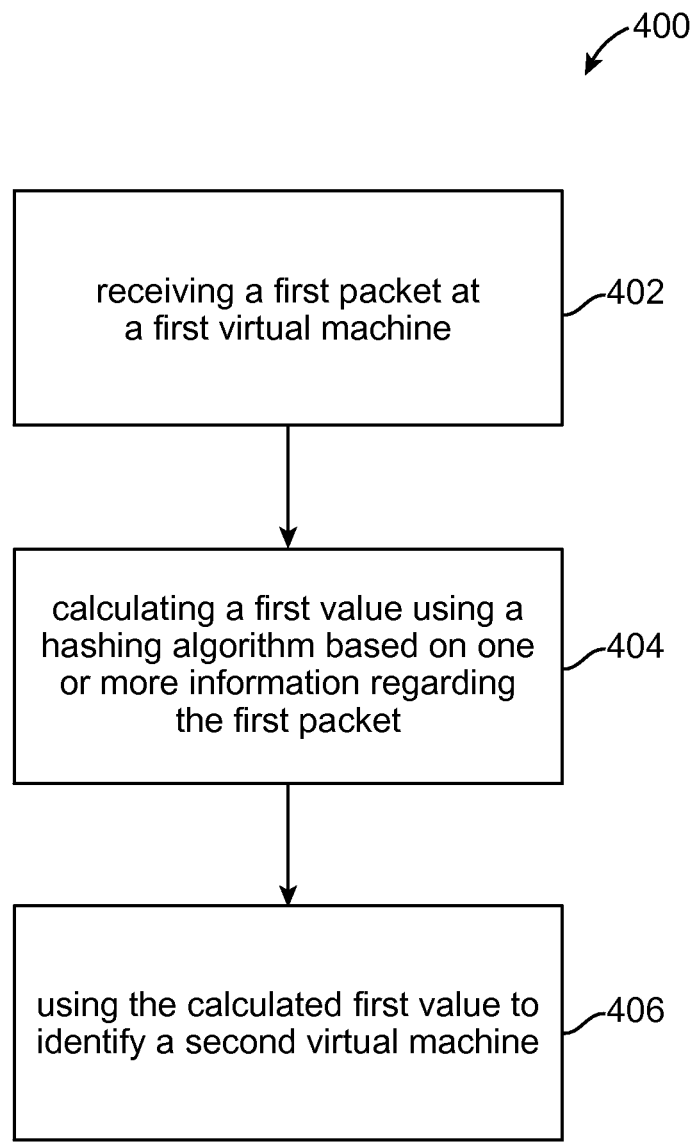
FIG. 4 illustrates a method of packet processing in accordance with some embodiments.

In the distributed database configuration, because there is no central management for managing all information, a special technique is needed to identify a database that is associated with a certain virtual machine 30 in order to store, retrieve, and operate on information stored therein. FIG. 4 illustrates a method 400 of processing a packet to identify a virtual machine 30 in a distributed database configuration. First, a packet is received by the network system 10 (Item 402). Next, a hash value is calculated using a mathematical algorithm (e.g., hashing algorithm) based on one or more information regarding the packet (item 404). In some embodiments, the calculating of the hash value may be performed by one of the DVSSM virtual machines 30, or by one of the DVIOM virtual machines 30, or by both. By means of non-limiting examples, the one or more information regarding the packet may be one or a combination of a source IP address, a destination IP address, a source port, a destination port, and protocol information. After the hash value is obtained, the hash value may then be used to identify the virtual machine 30 (Item 406). For example, in some embodiments, the hash value itself may be the identification of the virtual machine 30. In other embodiments, the hash value may be used as an index to look up a corresponding identification of a virtual machine 30. In the illustrated embodiments, the hash value is used to store and/or lookup information stored in a distributed database system associated with the network system 10 (e.g., to identify the virtual machine 30 that stores a certain information).

In some embodiments, after the virtual machine 30 has been identified in the distributed database system, the identified virtual machine 30 (e.g., its corresponding database) may then be used to store information regarding the packet. In other embodiments, information already stored in the corresponding database of the virtual machine 30 may be retrieved after the virtual machine 30 has been identified. In further embodiments, information stored in the corresponding database of the virtual machine 30 may be operated on (e.g., updated, deleted, etc.) after the virtual machine 30 has been identified.

It should be noted that because each virtual machine 30 (e.g., DVIOM, DVSSM, etc.) has a corresponding database associated therewith, the act of identifying the virtual machine 30 may be accomplished by determining the identification of the virtual machine 30, the identification of the database associated with the virtual machine 30 (which may be the same or different), or an identification of an instance of a virtual software. In some embodiments, the database associated with the corresponding virtual machine 30 may be considered to be a part of the virtual machine 30.

Figure 5:
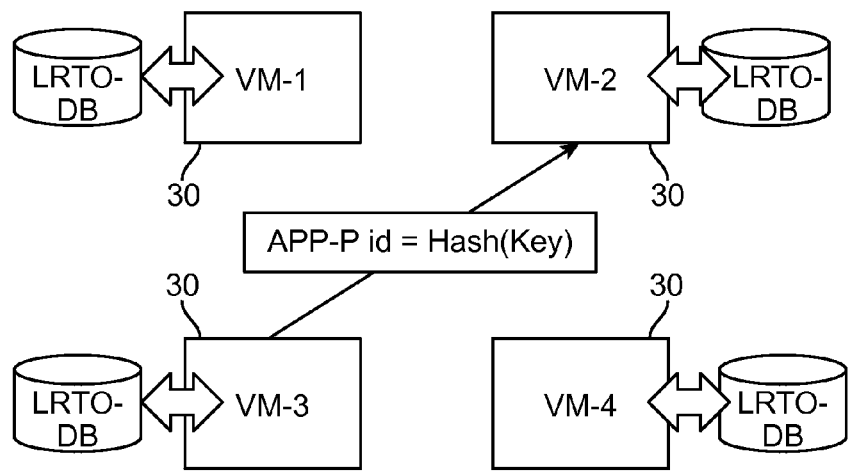
FIG. 5 illustrates a distributed database configuration for the network system of FIG. 1.

In the distributed database configuration, every RTO is stored only in one RTO database for a corresponding one virtual machine 30, which may be uniquely identified using a hash value, like that shown in FIG. 5. In other embodiments, every RTO may be stored in a number of RTO databases (e.g., for redundancy purpose), but the number is fewer than the total number of RTO databases for the entire network system 10 so that the system may still be considered a distributed database system, but not a fully synchronized database system.

In the distributed database system shown in FIG. 5, one virtual machine 30 ("VM-3" in the example) may retrieve information from a database of another virtual machine 30 ("VM-2" in the example) by first identifying the database from which the information is to be retrieved. Such may be accomplished by calculating a hash value using a hashing algorithm based on a key, like that discussed with reference to the method of FIG. 4. For example, the hashing algorithm may use a subset of values in the key, or all of the values in the key to calculate the hash value. The hash value may then be used to identify the database from which the information is to be retrieved. In some embodiments, the hash value itself is the identification of the database. In other embodiments, the hash value may be an index that can be used to look up an identification of the database (such as, through a lookup table). Because the virtual machine 30 has a corresponding database associated therewith, identification of the database may be accomplished by identifying the virtual machine 30, or vice versa. In such cases, the hash value may represent the identification of the database, and/or the identification of the corresponding virtual machine 30. Thus, in this specification, a reference to an identification of a database may refer to an identification of a virtual machine associated with the corresponding database, and vice versa. Also, because the database is also associated with a corresponding virtual software implementing the virtual machine 30, identification of the database may also be accomplished by identifying the instance of the virtual software implementing the virtual machine 30, or vice versa. In such cases, the hash value may represent identification of an instance of the virtual software implementing the corresponding virtual machine 30. Thus, in this specification, a reference to an identification of the database may refer to an identification of an instance of virtual software implementing a virtual machine 30, and vice versa.

After the database from which the information is to be retrieved has been identified, the key may then be used to retrieve the information from the database. In some embodiments, a part of a key may be used to calculate the hash value for identifying the database/virtual machine 30 (e.g., DVIOM, DVSSM, etc.)/instance of virtual software implementing a virtual machine, and then the full key is used (e.g., the fully key may be used directly as an index, or may be hashed to obtain a hash value, which is then used as an index) to look up the desired information from the database.

In some embodiments, the key described above for use in the distributed database operation for the network system 10 may be constructed using a 5-tuples that includes (1) a source IP address, (2) a destination IP address, (3) a source port, (4) a destination port, and (5) protocol information. Any information in this 5-tuples may have a fixed value, a range of values, or a "wildcard" identifier. In some embodiments, a key has at least one fixed value in the 5-tuples. In some embodiments, if all 5-tuples are fixed, then the 5-tuples are used as the key. Such key may be used to look up information regarding session, VPN SA, etc. In other embodiments, if a subset of the values in the 5-tuples is fixed, then only the fixed values (or a subset of the fixed values) in the 5-tuples may be used as the key. For example, if the destination IP address is fixed, then the destination IP address may be used as the key. Such key may be used to look up information regarding corn NAT, ALG gate, destination IP-based session limit, etc. In another example, if the source IP address is fixed, then the source IP address is used as the key. Such key may be used to look up information regarding Cone NAT, ALG gate, source IP-based session limit, etc. In other embodiments, in a rare situation, a key may contain no fixed value (e.g., each of the 5-typles is either a range of value or a wild card value). In such cases, the information may be fully populated to all databases (like that in a fully synchronized database configuration).

Figure 6:
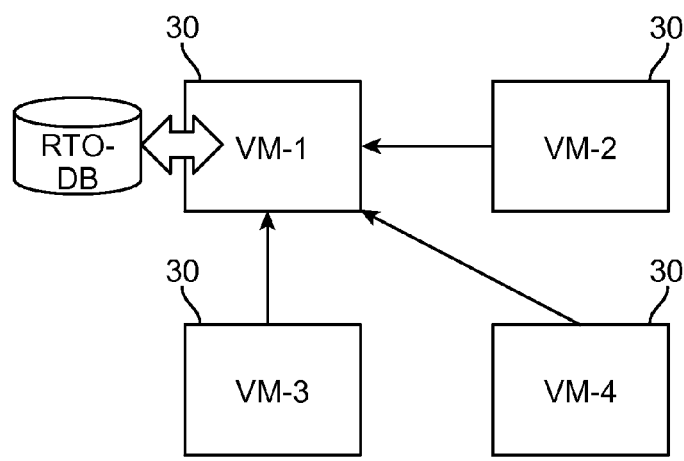
FIG. 6 illustrates a centralized database configuration in contrast with the distributed database configuration.
Figure 7:
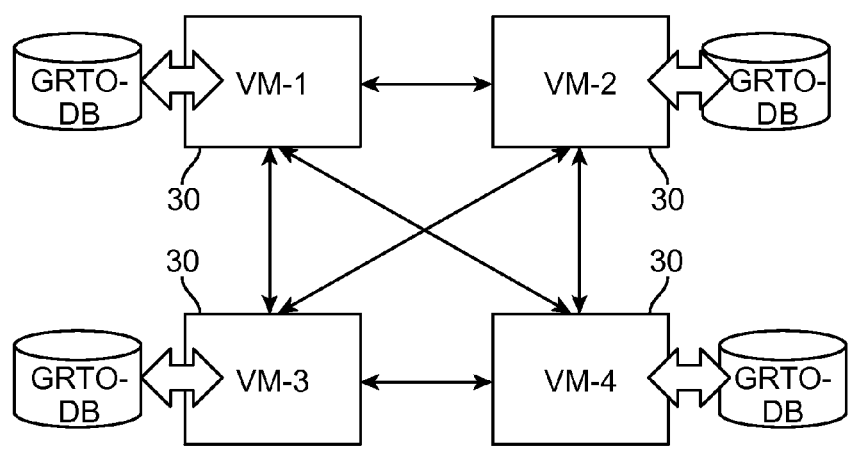
FIG. 7 illustrates a fully synchronized database configuration in contrast with the distributed database configuration.

As illustrated in the above embodiments, the distributed database configuration of the network system 10 is advantageous because its capacity may linearly scale up along with the number of virtual machines 30. Also, the database operations overhead remains constant while the number of virtual machines 30 may increase. Furthermore, such distributed database would require less resource for maintenance and synchronization compared to a centralized database configuration (in which all information is stored in one centralized database like that shown in FIG. 6) and a fully synchronized database configuration (in which each RTO database has a copy of a same information so that the information can be retrieved at each virtual machine 30 like that shown in FIG. 7). This is because in the network system 10, RTO information are stored and managed locally by the respective virtual machine 30 (e.g., DVIOM, DVSSM, etc.). Thus, unlike the centralized database in which a centralized CPU keeps track of all information in all virtual machines to have a view of the whole system, and distributes work accordingly, in the network system 10, there is no need for any centralized management. Also, the distributed database configuration of the network system 10 is advantageous because even if a virtual machine 30 is down, the network system 10 may still be functional because other virtual machines 30 may continue to perform packet processing based on the distributed database configuration described previously. This is in contrast to the centralized database configuration in which if the centralized CPU is down, then the entire system becomes non-functional.

Also, the network system 10 implemented using virtual machines 30 is advantageous. First, the virtual machine-implemented system 10 may provide a 100% software solution for cloud security. This obviates the need to deploy multiple hardware appliances, which may be difficult and expensive to manage and maintain. In one implementation, VCPM, DVIOM, DVSSM are all software modules for implementing virtual machines distributed among data center cloud. This may provide great flexibilities in term of deployment. The virtual-machine implemented network system 10 may also offer a lower initial investment, and user(s) may pay as the system 10 is scaled up. In some cases, a data center cloud service may include an on-demand service, and by running these service appliances on the virtual machines, they can be easily added, removed and/or migrated depending on the service demands. The virtual machine-implemented system 10 also provides ease for management. In some embodiments, a standard management interface platform may be used to ease the management burden. Also, the virtual machine-implemented system 10 provides elasticity because DVIOM and DVSSM may be added or removed on demand. The system 10 also provides high bandwidth and scalability. In some embodiments, the system 10 may easily be scaled up to support tens of terabits or more. Furthermore, the system 10 provides load balanced by nature. In particular, with the system 10, load balance is naturally achieved on INT and DVIOM using balanced and consistent hashing algorithms.

In addition, since the DVIOM and DVSSM are software components implementing virtual machines, high bandwidth and scalability can be easily achieved by adding more DVIOM virtual machine(s) 30 and/or DVSSM virtual machine(s) 30. This also eliminates bandwidth limitation and latency involved in another solution in which a single virtual machine security appliance is used. In particular, in a different technique, multiple virtual gateways running on virtual machines may be used. In this case, a user may have its own virtual security gateways, wherein traffic that needs to be inspected and protected may be redirected to the virtual gateways. However, in such technique, it may be difficult to manage these virtual machines. Also, since each virtual security gateway has a limited bandwidth, adding more gateways will introduce larger latency.

Also, the system 10 is advantageous because there is system-wide knowledge on the control plane. This eases the burden of configuration management as well as the system monitoring and other management tasks.

In the distributed database configuration of the system 10, because there is no centralized CPU that manages everything, and because network information are stored respectively at different databases for the respective virtual machines 30 (e.g., DVIOM, DVSSM, etc.), the network system 10 is configured to lookup network information (e.g., network parameters) from the different databases. For example, in some embodiments, when a packet is received by the network system 10, the 5-tuples obtained from the packet is hashed to obtain a hash value. The hash value is used to identify the database that relates to flow processing. A query is then sent (e.g., by a virtual machine 30) to another virtual machine 30 that hosts the identified (based on the hash value) database to get the desired network information. By means of non-limiting examples, the network information may be a counter, a mapping, session counter, session limit, etc. For example, for session setup, the query may ask for a counter for a current session. If the counter for the current session returned by the database is less than a prescribed maximum value, then the application processing unit 30 may set up a session for the packet. Also, in some embodiments, the session counter may be updated in the corresponding database.

Figure 8:
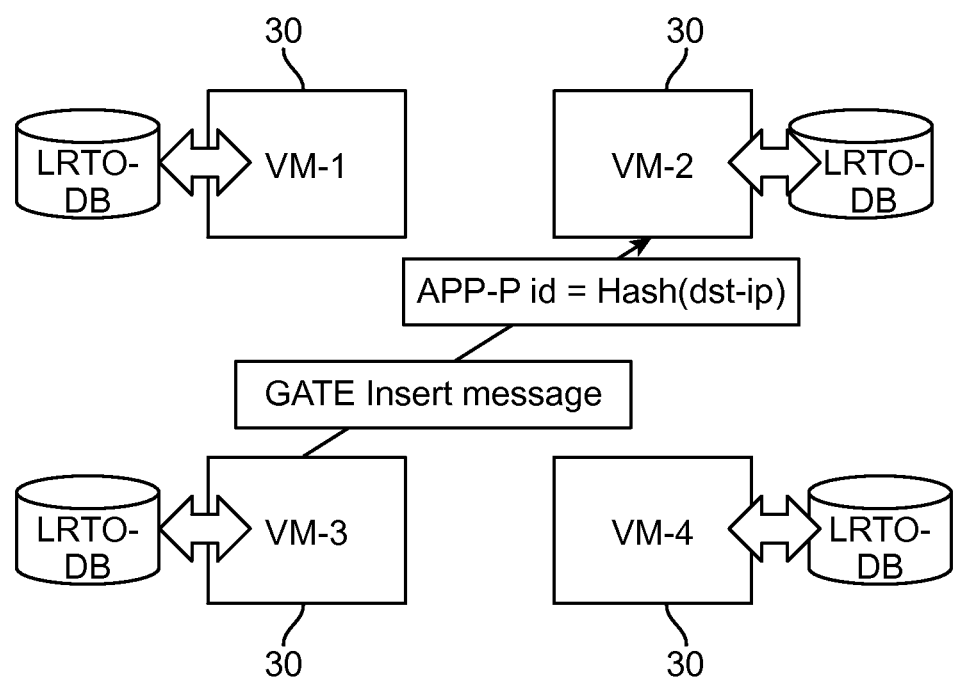
FIG. 8 illustrates an example of packet processing in a distributed database.

FIG. 8 illustrates an example of a RTO database operation in a distributed database configuration that involves ALG Gate (e.g., FTP) insert. Initially, no Gate is setup for a particular packet. As part of the slow-path processing, it may be determined that a Gate needs to be created. In some embodiments, a Gate may be created by one of the virtual machines 30 ("VM-3" in the example). Also, in some embodiments, the I/O card may use the 5-tuple key (e.g., the key itself, or a hash value of it) to identify the virtual machine 30. In the illustrated example, the created Gate may be associated with a 5-tuple key derived from a packet for which the Gate is created. The 5-tuple key may have the format: [dst-ip, *, dst-port, src-port, protocol], wherein "dst-ip" represents destination IP address, "dst-port" represents destination port, "src-port" represents source port, and "*" represents a wildcard. The 5-tuple key represents an unique Gate ID for the created Gate. Next, a portion of the 5-tuple key ("dst-ip") is used to calculate a hash value for identifying a RTO database associated with one of the virtual machines 30 for storing the created Gate. In some embodiments, the calculating of the hash value may be performed by VM-3. In the example, the calculated hash value may represent an identification of another virtual machine 30 ("VM-2" in the example). In such cases, the Gate together with its globally unique Gate ID are then sent from VM-3 to VM-2 for storage at the database for VM-2.

In some embodiments, when a new packet comes in, the network system 10 may retrieve the Gate information in the database hosted by VM-2 for the new packet. For example, in some embodiments, when a new packet is received by the network system 10, the network system 10 may not find a session for the packet. The network system 10 may then determine whether there is a Gate created for the packet. If there is a Gate, then the network system 10 may create a session. The virtual machine 30 (e.g., VM-3) may use the "dst-ip" part of the key (determined from processing the newly received packet) to calculate a hash value. The hash value is then used to identify the database at which the Gate information is stored. In this example, the identified database is the database associated with the virtual machine 30 "VM-2". The virtual machine 30 "VM-3" may then send a retrieval message along with the 5-tuple key to VM-2. When VM-2 receives the query and the 5-tuple key from VM-3, VM-2 looks up its RTO database using the 5-tuple key to see if there is a match. If so, the VM-2 may then send back the Gate information back to VM-3, and VM-3 may then create a session for the packet.

Also, in some embodiments, the Gate information stored at the database associated with one of the virtual machines 30 may be operated on (e.g., it may be updated, deleted, etc.). For example, in some embodiments, the virtual machine 30 (e.g., VM-3) may use the "dst-ip" part of the key to calculate a hash value. The hash value is then used to identify the database at which the Gate information is stored. In this example, the identified database is the database associated with the virtual machine 30 "VM-2". The virtual machine "VM-3" may then send an operational message (e.g., an update or delete message) to VM-2 with the Gate ID (which is the full key). When VM-2 receives the Gate ID from VM-3, VM-2 looks up its database to see if there is a match. If so, the VM-2 may then perform the requested operation, may then send back an acknowledgement message back to VM-3 after the operation is completed.

It should be noted that RTO information is not limited to the Gate information described in the previous example, and that there may be other types of RTO information. For example, RTO information may include information regarding a flow session, in which case, the 5-tuples may be used as the key (e.g., in a hashing operation) for identifying the database/corresponding virtual machine 30 that has the flow session information.

In another example, RTO information may include information regarding VPN SA, in which case, the 5-tuples may be used as the key (e.g., in a hashing operation) for identifying the database/corresponding virtual machine 30 that has the VPN SA information. In other embodiments, the source IP address and/or the destination IP address may be used as the hash key to locate the virtual machine to perform the RTO lookup.

In another example, RTO information may include information regarding full Gate, in which case, the 5-tuples may be used as the key (e.g., in a hashing operation) for identifying the database/corresponding virtual machine 30 that has the full Gate information.

In another example, RTO information may include information regarding session limit that is either source IP based or destination IP based. In such case, the source IP address or the destination IP address in the 5-tuples may be used (e.g., in a hashing operation) for identifying the database/corresponding virtual machine 30 that has the session limit information.

In another example, RTO information may include information regarding AD counter. In such case, the source IP address or the destination IP address in the 5-tuples may be used (e.g., in a hashing operation) for identifying the database/corresponding virtual machine that has the AD counter information.

In still another example, RTO information may include information regarding syn attack (such as syn attack counter). In such case, the source IP address or the destination IP address in the 5-tuples may be used (e.g., in a hashing operation) for identifying the database/corresponding virtual machine 30 that has the syn attack information.

In another example, RTO information may include information regarding Cone NAT (e.g., mapping information). In such cases, there may be two RTO entries, one for forward mapping, and another one for reverse mapping. The original source IP address may be used as the key (e.g., in a first hashing operation) for identifying the database/corresponding virtual machine 30 that has the forward mapping information, and the "NATed" source IP address may be used as the key (e.g., in a second hashing operation) for identifying the database/corresponding virtual machine 30 that has the reverse mapping information.

In some embodiments, except for session RTOs and SA RTOs, all of the RTOs with the same destination IP address or source IP address may be stored in the same RTO database. Also, in some embodiments, for a given packet with a fixed destination IP address and source IP address, two RTO database queries may be issued by a virtual machine 30 to retrieve all of the relevant RTOs for the packet. For example, one query may be issued to a virtual machine 30 (e.g., VM-1) that is identified by hashing the destination IP address in the key, and another query may be issued to another virtual machine 30 (e.g., VM-2) that is identified by hashing the source IP address in the key.

Figure 9A:
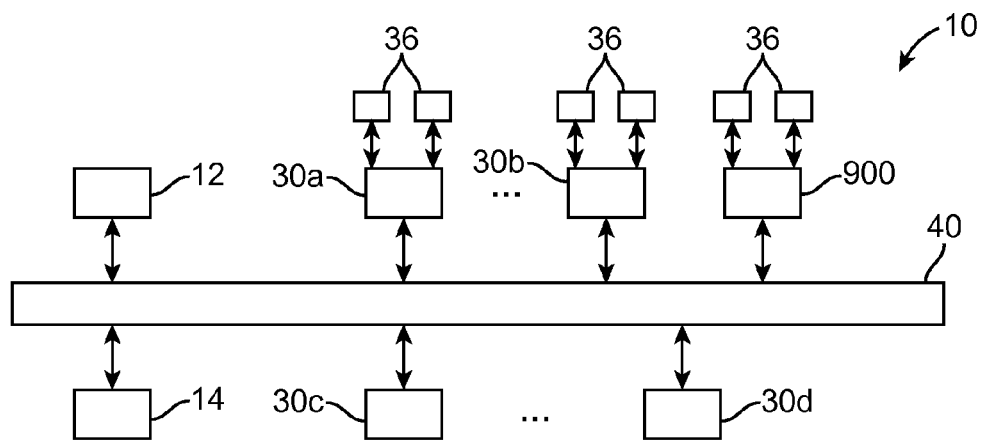
FIG. 9A illustrates a network system implemented using virtual machines and physical machines.

In the above embodiments, the network system 10 has been described as being implemented using a plurality of virtual machines 30. In other embodiments, the network system 10 may be implemented using both virtual machines 30 and physical machine(s). For example, as shown in FIG. 9A, in some embodiments, one or more (e.g., all) of the DVIOM virtual machines described previously may be implemented using physical machine(s) 900. The physical machine(s) 900 may be configured to interface with the network through respective I/O interfaces. Also, in some embodiments, a physical machine 900 may be configured to create session(s) and/or may have session processing capability, as similarly discussed with reference to the DVIOM virtual machine.

Figure 9B:
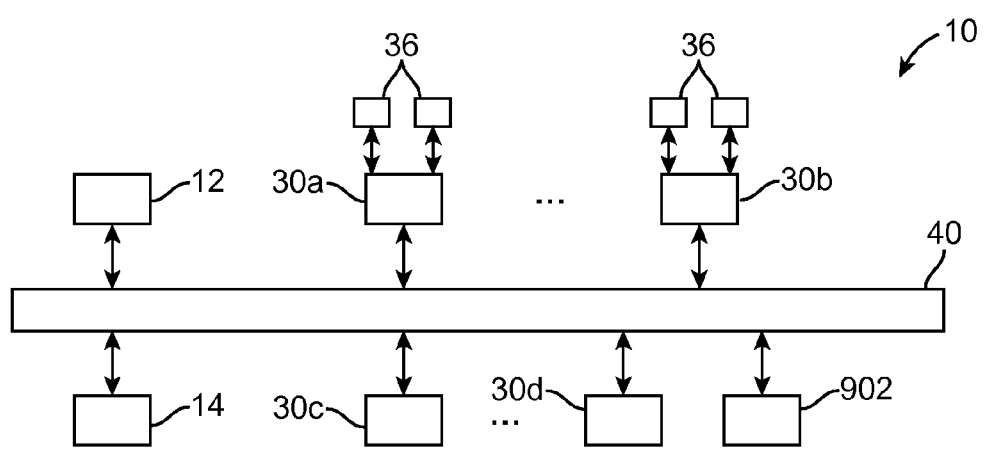
FIG. 9B illustrates another network system implemented using virtual machines and physical machines.
Figure 9C:
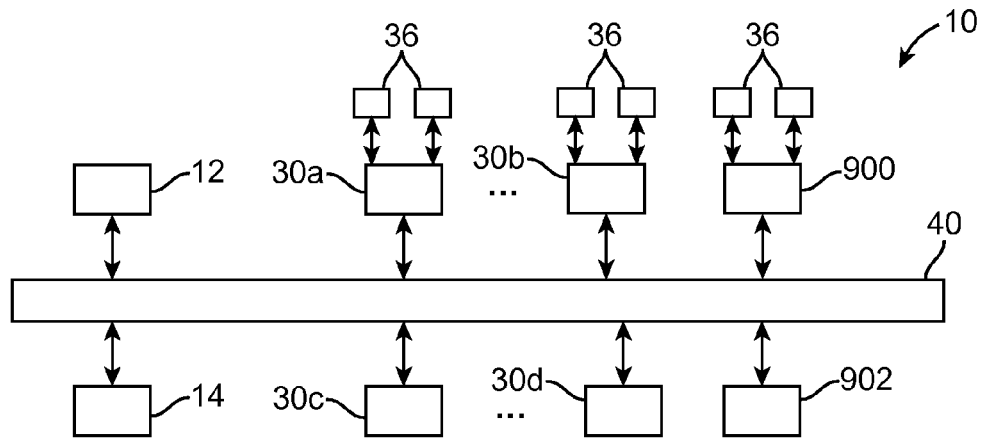
FIG. 9C illustrates another network system implemented using virtual machines and physical machines.

In other embodiments, one or more (e.g., all) of the DVSSM virtual machines described previously may be implemented using physical machine(s) 902 (FIG. 9B). The physical machine(s) 902 may be configured to provide firewall security functions.

In still further embodiments, one or more of the DVIOM virtual machines may be implemented using physical machine(s) 900, and one or more DVSSM virtual machines may be implemented using physical machine(s) 902 (FIG.

9C). A physical machine 900/902 may be a computer, or any physical device, that is configured to perform the functions described herein.

Computer System Architecture

Figure 10:
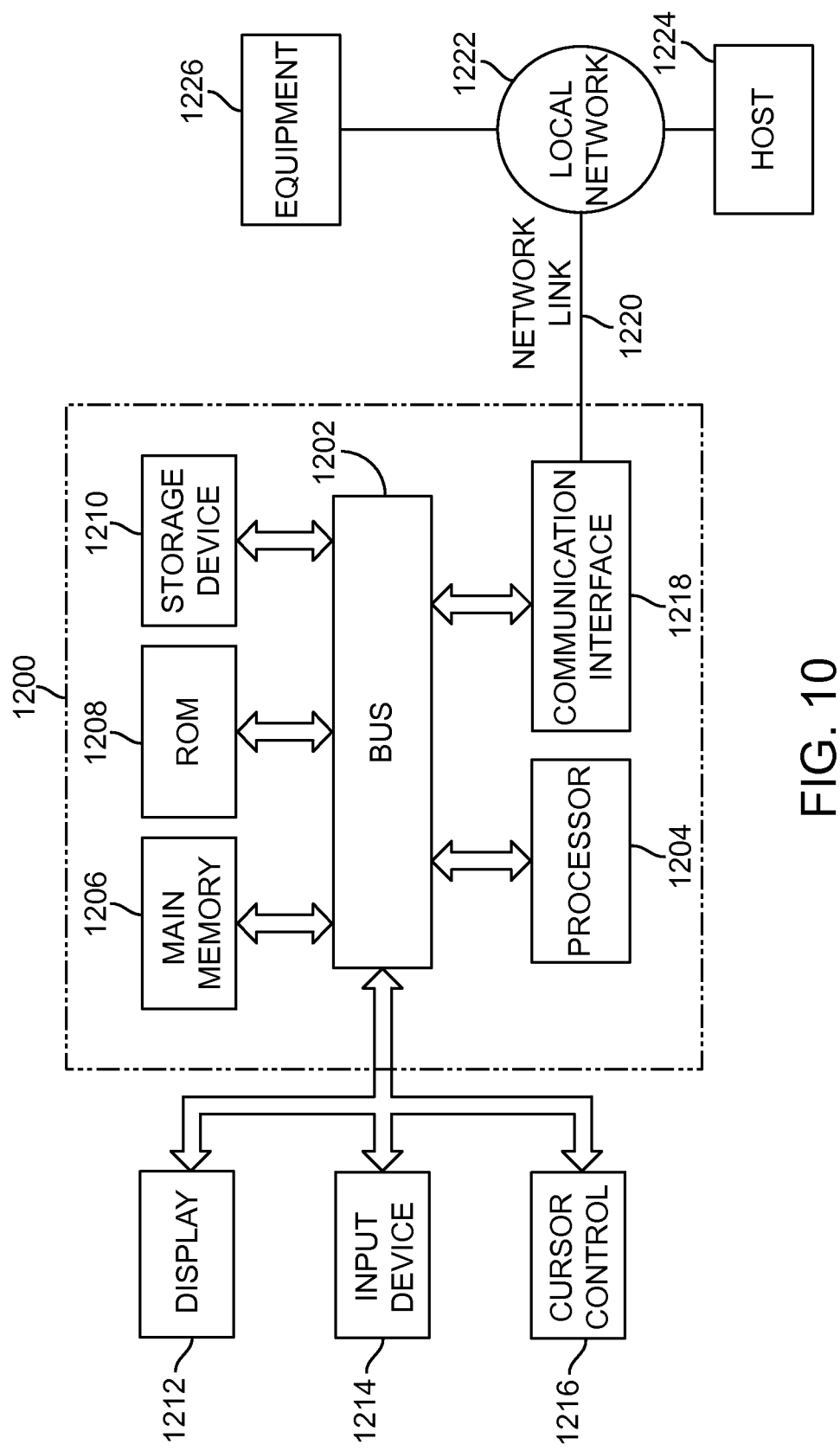
FIG. 10 illustrates an example of a computer system with which embodiments described herein may be implemented.

As discussed above, the network system 10 includes a plurality of virtual machines 30. In some embodiments, each virtual machine 30 may be implemented using a computer system. FIG. 10 is a block diagram that illustrates an embodiment of a computer system 1200 upon which embodiments described herein may be implemented. For example, in some embodiments, the computer system 1200 may be used to implement one or more functions of a virtual machine described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method performed by a network system having a plurality of processing units implemented using a plurality of respective virtual machines, comprising:
    receiving a first packet at a first virtual machine of the plurality of virtual machines, wherein the first virtual machine is configured to receive the first packet from a network through an interface and has session processing capability;
    calculating a first value using a mathematical algorithm based on one or more information regarding the first packet; and
    using the calculated first value to identify a second virtual machine of the plurality of virtual machines in the network system;
    wherein at least some of the virtual machines have respective databases associated therewith, and the method further comprises storing packets and/or information regarding the packets among the databases in a distributed manner.

2. The method of claim 1, wherein the one or more information comprises one or a combination of a source IP address, a destination IP address, a source port identifier, a destination port identifier, and protocol information.

3. The method of claim 1, wherein at least two of the virtual machines are configured to perform different respective packet processing functions.

4. The method of claim 1, further comprising retrieving data from the identified second virtual machine based at least in part on a set of information regarding the first packet, the set of information being a superset of the one or more information used to calculate the first value.

5. The method of claim 4, wherein the set of information for retrieving the data comprises source IP address, destination IP address, source port, destination port, and protocol information, and wherein the one or more information for calculating the first value comprises a subset of the set of information.

6. The method of claim 4, wherein the act of retrieving the data from the identified second virtual machine comprises retrieving the data from a database associated with the second virtual machine.

7. The method of claim 1, further comprising receiving data from the identified second virtual machine, wherein the act of receiving the data is performed by a third virtual machine of the plurality of virtual machines in the network system that is different from the second virtual machine identified using the calculated first value.

8. A method performed by a network system having a plurality of processing units implemented using a plurality of respective virtual machines, comprising:
    receiving a first packet at a first virtual machine of the plurality of virtual machines, wherein the first virtual machine is configured to receive the first packet from a network through an interface and has session processing capability;
    calculating a first value using a mathematical algorithm based on one or more information regarding the first packet; and
    using the calculated first value to identify a second virtual machine of the plurality of virtual machines in the network system;
    wherein at least some of the virtual machines have respective databases associated therewith, and the method further comprises storing data regarding the first packet at one of the databases that is associated with the identified second virtual machine.

9. The method of claim 8, wherein at least one of the databases does not have a copy of the data.

10. The method of claim 1, further comprising:
    receiving a second packet at the network system;
    calculating a second value based on one or more information regarding the second packet; and
    using the calculated second value to identify a third virtual machine of the plurality of virtual machines.

11. The method of claim 1, further comprising:
    creating a packet processing session based at least in part on the first packet, the packet processing session representing a packet processing plan.

12. The method of claim 11, wherein the first virtual machine is a distributed virtual I/O module (DVIOM) virtual machine, and the packet processing session is created by the DVIOM virtual machine.

13. The method of claim 11, further comprising storing the packet processing session in a first session database associated with the first virtual machine at which the first packet is received.

14. A method performed by a network system having a plurality of processing units implemented using a plurality of respective virtual machines, comprising:
    receiving a first packet at a first virtual machine of the plurality of virtual machines, wherein the first virtual machine is configured to receive the first packet from a network through an interface and has session processing capability;
    calculating a first value using a mathematical algorithm based on one or more information regarding the first packet;
    using the calculated first value to identify a second virtual machine of the plurality of virtual machines in the network system;
    creating a packet processing session based at least in part on the first packet, the packet processing session representing a packet processing plan; and
    storing the packet processing session in a first session database associated with the first virtual machine at which the first packet is received;
    wherein the packet processing session is also stored in a second session database for another one of the virtual machines at which the first packet is egressed.

15. The method of claim 11, further comprising:
    receiving a second packet at the first virtual machine;
    processing the second packet at the first virtual machine according to the packet processing session; and
    egressing the second packet from the first virtual machine.

16. The method of claim 15, wherein the first virtual machine is a distributed virtual I/O module (DVIOM) virtual machine.

17. The method of claim 11, further comprising:
receiving a second packet at the first virtual machine;
transmitting the second packet to a third virtual machine;
processing the second packet at the third virtual machine according to the packet processing session; and
egressing the second packet from the third virtual machine.

18. The method of claim 17, wherein the first virtual machine is a first distributed virtual I/O module (DVIOM) virtual machine, and the third virtual machine is a second DVIOM virtual machine.

19. The method of claim 1, wherein the network system is configured to perform packet processing in either a slow-path or a fast-path, and the act of calculating the first value and the act of using the calculated first value to identify the second virtual machine are performed while processing the first packet in the slow-path.

20. A network system, comprising:
a plurality of virtual machines that are communicatively connected to each other;
wherein a first virtual machine of the plurality of virtual machines is configured to receive a first packet from a network through an interface and has session processing capability; and
wherein the first virtual machine is configured for:
calculating a first value using a mathematical algorithm based on one or more information regarding the first packet; and
using the calculated first value to identify a second virtual machine of the plurality of virtual machines;
wherein the network system further comprises respective databases associated with at least some of the virtual machines, wherein packets and/or information regarding the packets are stored among the databases in a distributed manner.

21. The network system of claim 20, wherein the one or more information comprises one or a combination of a source IP address, a destination IP address, a source port identifier, a destination port identifier, and protocol information.

22. The network system of claim 20, wherein at least two of the virtual machines are configured to perform different respective packet processing functions.

23. The network system of claim 20, wherein the first virtual machine is configured for retrieving data from the identified second virtual machine based at least in part on a set of information regarding the first packet, the set of information being a superset of the one or more information used to calculate the first value for identifying the second virtual machine.

24. The network system of claim 23, wherein the set of information for retrieving the data comprises source IP address, destination IP address, source port, destination port, and protocol information, and wherein the one or more information for calculating the first value comprises a subset of the set of information.

25. The network system of claim 20, wherein the first virtual machine is configured for retrieving data from the identified second virtual machine by retrieving data from a database associated with the second virtual machine.

26. A network system, comprising:
a plurality of virtual machines that are communicatively connected to each other;
wherein a first virtual machine of the plurality of virtual machines is configured to receive a first packet from a network through an interface and has session processing capability; and
wherein the first virtual machine is configured for:
calculating a first value using a mathematical algorithm based on one or more information regarding the first packet; and
using the calculated first value to identify a second virtual machine of the plurality of virtual machines; and
wherein the network system further comprises respective databases associated with at least some of the virtual machines, wherein one of the databases that is associated with the identified second virtual machine is configured for storing data regarding the first packet.

27. The network system of claim 26, wherein at least one of the databases does not have a copy of the data.

28. The network system of claim 20, wherein the first virtual machine is configured for:
calculating a second value based on one or more information regarding a second packet; and
using the calculated second value to identify a third virtual machine of the plurality of virtual machines.

29. The network system of claim 20, wherein one of the virtual machines is configured for creating a packet processing session based at least in part on the first packet, the packet processing session representing a packet processing plan.

30. The network system of claim 29, wherein the first virtual machine is a DVIOM virtual machine, and is configured to create the packet processing session.

31. The network system of claim 29, further comprising a first session database for storing the packet processing session, the first session database associated with the first virtual machine at which the first packet is received.

32. A network system, comprising:
a plurality of virtual machines that are communicatively connected to each other;
wherein a first virtual machine of the plurality of virtual machines is configured to receive a first packet from a network through an interface and has session processing capability; and
wherein the first virtual machine is configured for:
calculating a first value using a mathematical algorithm based on one or more information regarding the first packet; and
using the calculated first value to identify a second virtual machine of the plurality of virtual machines;
wherein one of the virtual machines is configured for creating a packet processing session based at least in part on the first packet, the packet processing session representing a packet processing plan;
wherein the network system further comprises a first session database for storing the packet processing session, the first session database associated with the first virtual machine at which the first packet is received; and
wherein the network system further comprises a second session database for storing the packet processing session, the second session database associated with another one of the virtual machines at which the first packet is egressed.

33. The network system of claim 29, wherein the first virtual machine is configured for:
receiving a second packet;
processing the second packet according to the packet processing session; and
egressing the second packet from the first virtual machine.

34. The network system of claim 33, wherein the first virtual machine is a distributed virtual I/O module (DVIOM) virtual machine.

35. The network system of claim 29, wherein the first virtual machine is configured for receiving a second packet, and transmitting the second packet to a third virtual machine; and wherein the third virtual machine is configured for processing the second packet according to the packet processing session, and egressing the second packet from the third virtual machine.

36. The network system of claim 35, wherein the first virtual machine is a first distributed virtual I/O module (DVIOM) virtual machine, and the third virtual machine is a second DVIOM virtual machine.

37. A network system, comprising:
a plurality of virtual machines that are communicatively connected to each other;
wherein a first virtual machine of the plurality of virtual machines is configured to receive a first packet from a network through an interface and has session processing capability; and
wherein the first virtual machine is configured for:
calculating a first value using a mathematical algorithm based on one or more information regarding the first packet; and
using the calculated first value to identify a second virtual machine of the plurality of virtual machines;
wherein one of the virtual machines is configured for creating a packet processing session based at least in part on the first packet, the packet processing session representing a packet processing plan; and
wherein the first packet is egressed at a third virtual machine, and wherein the packet processing session is stored in the first virtual machine at which the first packet is received, and in the third virtual machine at which the first packet is egressed.

38. The network system of claim 20, wherein the network system is configured to perform packet processing in either a slow-path or a fast-path, and the first virtual machine is configured to perform the act of calculating the first value and the act of using the calculated first value to identify the second virtual machine while processing the first packet in the slow-path.

39. The network system of claim 20, wherein the first virtual machine provides a first application processing function, and the second virtual machine provides a second application processing function.

40. The network system of claim 20, wherein the first virtual machine provides an I/O function, and the second virtual machine provides an application processing function.

41. A network system, comprising:
a plurality of machines comprising a first virtual machine and a second virtual machine that are configured to communicate with each other;
wherein the first virtual machine is configured to receive a first packet from a network through an interface and has session processing capability; and
wherein the first virtual machine is configured for:
calculating a first value using a mathematical algorithm based on one or more information regarding the first packet;
using the calculated first value to identify the second virtual machine of the plurality of machines; and
a database associated with the second virtual machine and configured to store the first packet, or at least one of the one or more information regarding the first packet.

42. The network system of claim 41, wherein the first virtual machine comprises a virtual I/O module.

43. The network system of claim 41, wherein the second virtual machine comprises a virtual security service module.

44. The network system of claim 41, further comprising a physical machine configured to communicate with the network.

45. The network system of claim 41, further comprising a plurality of physical machines configured to provide firewall security functions.

* * * * *